United States Patent [19]
Fisch et al.

[11] Patent Number: 5,573,159
[45] Date of Patent: Nov. 12, 1996

[54] ROOF RAILING FOR MOTOR VEHICLES

[75] Inventors: Fritz Fisch; Karl-Heinz Lumpe; Klaus Kolodziej, all of Wuppertal, Germany

[73] Assignee: Happich Fahrzeug-Dachsysteme GmbH, Germany

[21] Appl. No.: 337,278

[22] Filed: Nov. 10, 1994

[30] Foreign Application Priority Data

Nov. 23, 1993 [DE] Germany ............ 43 39 879.0

[51] Int. Cl.$^6$ ............ B60R 9/04; B60R 9/05
[52] U.S. Cl. ............ 224/309; 224/316; 224/326; 224/917.5
[58] Field of Search .......... 224/511, 517, 224/309, 316, 325, 326, 327, 328, 917.5

[56] References Cited

U.S. PATENT DOCUMENTS

| | | | |
|---|---|---|---|
| 4,279,368 | 7/1981 | Kowalski | 224/309 |
| 4,448,336 | 5/1984 | Bott | 224/309 |
| 4,811,877 | 3/1989 | Heideman | 224/325 |
| 4,834,448 | 5/1989 | Sakamoto et al. | 224/309 |

*Primary Examiner*—Renee S. Luebke
*Assistant Examiner*—Charles R. Eloshway
*Attorney, Agent, or Firm*—Ostrolenk, Faber, Gerb & Soffen, LLP

[57] ABSTRACT

A roof railing having a rail with opposite ends and a respective support foot on each end. The support foot is a tubular extruded profile shaped to have a downwardly descending curved part which leads into a flat support surface that is below and parallel to the rail. A flattened wall region of the extruded profile rests on the top of the support surface. A hole through the support surface and the flattened wall region receives a fastening element. A cover cap over the support foot includes a web over the top and side legs down from the web and the cover cap is clipped to the support foot and may be pivoted to be upraised with respect to the support foot.

17 Claims, 3 Drawing Sheets

5,573,159

ROOF RAILING FOR MOTOR VEHICLES

BACKGROUND OF THE INVENTION

The present invention relates to a roof railing for motor vehicles which includes a rail which is supported at each end of the rail on the roof of the vehicle via a support foot.

A roof railing of this type, shown in Federal Republic of Germany Patent 40 04 829, ordinarily includes at least one rail extending along each side of the roof and at least two feet supporting each rail. For mounting, the rails and feet are assembled, and the feet are provided with threaded bolts having protruding ends which are passed through holes in the roof plate. Nuts are applied to these threaded bolts from the other side of the roof plate.

The cost of producing a traditional roof railing is high. Typically, the rails are made individually and are frequently bent in two planes, corresponding to the contour of the roof. The feet are also produced separately and are surface adapted to the rails, which, despite high expense, cannot always be assured. Differences in gloss between the rails and the feet and, after the mounting has been effected, mismatch between the feet and the rails can frequently be noted. One particular disadvantage of roof railings of the traditional type is their relatively heavy weight, since the feet are frequently developed as solid castings. Therefore, depending on the styling of the support feet, considerable grinding and polishing work is frequently necessary in order to obtain an aesthetically attractive surface. Since this work can only be carried out manually, this also has a negative effect on the price of the parts.

SUMMARY OF THE INVENTION

It is an object of the present invention to provide a roof railing of the aforementioned type which, while it is relatively simple and inexpensive to manufacture, it is characterized by particularly good appearance, low weight, and simple mounting on the vehicle.

In the invention, each support comprises a tubular extruded profile member. It has downwardly descending curved part and a freely ending substantially flat support surface adjacent to it which extends spaced vertically from but substantially parallel to the rail. A flattened wall region of the extruded profile member rests from above against the support surface. The support surface and the region of the wall resting on it have a hole passing through them for the passage of a fastening member. A cover cap is arranged on each foot.

The reduction in weight and the saving in expense obtained by the measures of the invention, as compared with a roof railing having solid cast feet, are of particular importance. The passage hole provided in each in each of the support feet permits simple mounting and also enables subsequent attachment. The fastening elements are not visible because they are obscured by cover caps, which have an essentially decorative purpose. As a result, the roof railing of the invention also is stylistically attractive overall.

In one particularly favorable development of the invention, each end region of the rail is shaped as a support foot, whereby the rail and its support feet are developed as a single structural unit. Separate manufacture of the rail and of its support feet, as well as the later assembly of these parts, can be done away with, producing a considerable saving in expense.

To further improve the appearance of the roof railing, a step shaped offset can be formed in the transition region from the rail to the curved part of the support foot. This shoulder permits a transition without mismatch between the rail and the free end of each cover cap which rests against the shoulder.

The cover caps can be fastened to the support feet by clip members formed on the cover caps. In this case, each support foot has at least one wall opening with undercuts for the entry and engagement behind them of the clip elements which are developed on the cover caps. The cover caps are swingably pivoted via respective pivot pins on the support feet so that, when the caps are swung up, they permit access to the fastening parts.

This measure is particularly advantageous for users of a roof railing who want to remove the railing in the event that the roof of the vehicle is to be painted. The pivoted attachment of the cover caps holds them in a non-losable manner on the support feet and avoids need for special attention as to where the cover caps have been placed.

In another embodiment of the invention, each support foot can be developed with a downwardly protruding continuous rib having free spaces remaining to the left and right of the rib. Each foot has an insertion pin which passes into the rail ends. Slot openings to receive the rib present on each support foot are provided in the end regions of the rail.

The fact that the cross section of the support feet is thereby reduced as compared with the rail is unimportant since it will be moved by the cover caps. In a preferred further development of the invention, each cover cap can have a U-shaped cross section with a web which covers the support foot on its top and two legs which cover the support foot on its two sides, and have inwardly directed projections of material formed on the free end regions of the legs. These projections can engage into the free spaces in the support feet.

It is obvious that the wall thickness of the cover caps should correspond to the thickness of the wall of the rail in order to assure a smooth transition between the rail and the cover caps.

Clip parts and a bearing bracket having a slot for the pivot pin are developed on the bottom side of the web of each cover cap.

Other features and advantages of the present invention will become apparent from the following description of the invention which refers to the accompanying drawings.

DETAILED DESCRIPTION OF THE INVENTION

Figure 3:
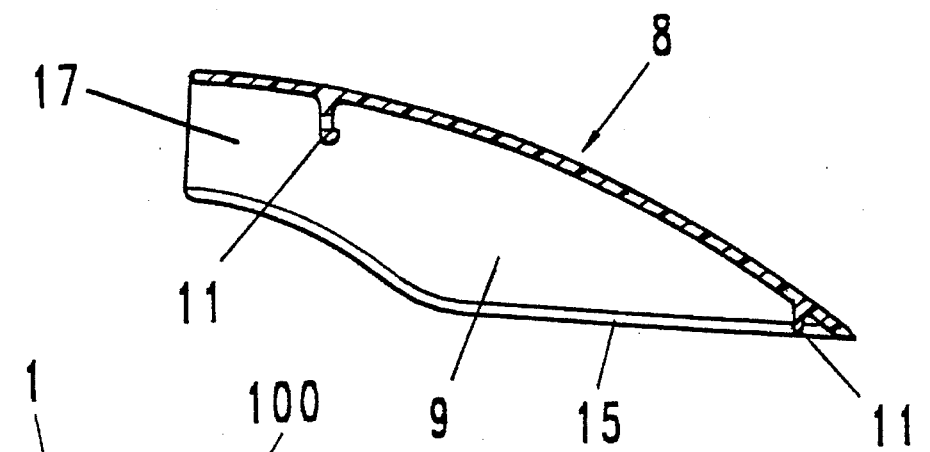
FIG. 3 is a longitudinal section through the cover cap of FIG. 2.

The main part of the roof railing in FIGS. 1 to 4 is the rail 1 which would extend along the length dimension along the roof of a vehicle (not shown). The rail is so curved in shape at its ends as to form support feet 2 which are developed integrally with the rail 1. Only one foot is shown in the drawing. Each support foot 2 is developed with a descending curved bottom part 3 that descends from the rail body and leads into an adjoining freely terminating, substantially flat support surface 4 which extends freely and is spaced vertically below but substantially parallel to the rail 1. A flattened wall region 5 of the end of the rail rests on top of the support surface 4. A hole 6 for the passage of a fastening element 7 passes through the wall region of the support foot 2.

The support foot 2 is supplemented in its appearance by a cover cap 8 which covers the shaped region of the foot 2 from above and, by means of sheets 9 formed on the cap, also covers the foot on its two opposite lateral sides.

Figure 1:
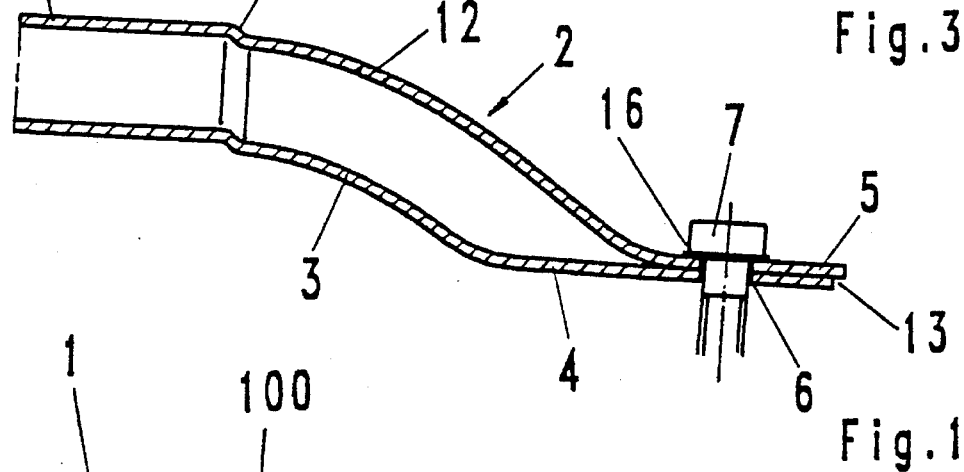
FIG. 1 shows a cross section through a first embodiment of the roof railing with a support foot developed on the rail.
Figure 2:
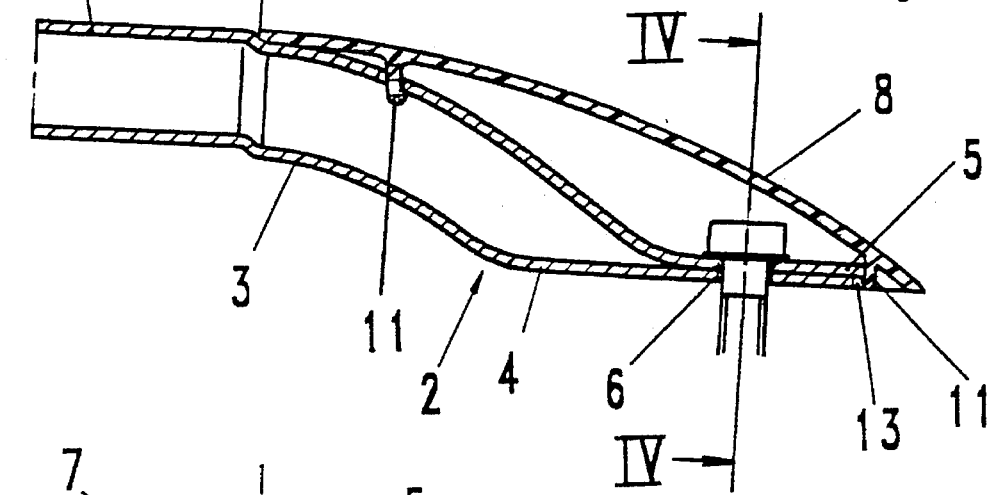
FIG. 2 shows a cross section through the roof railing of FIG. 1 with a cover cap fastened on the support foot.
Figure 4:
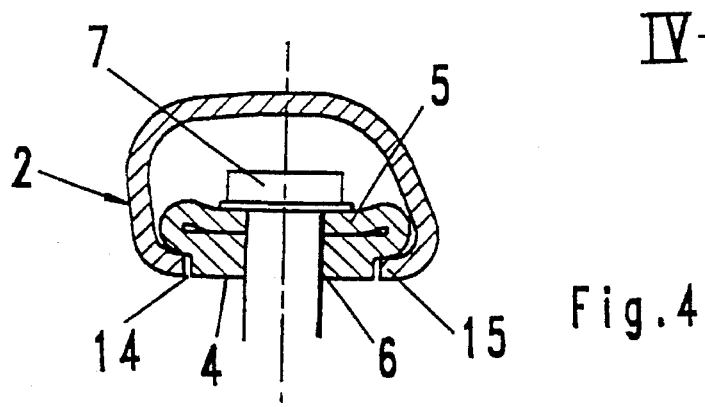
FIG. 4 is a cross section approximately along the line IV—IV of FIG. 2.

To manufacture a roof railing, a rail which has been cut to length is flattened and deformed at its end regions to the shape in FIG. 1, for instance in a die or a special auxiliary device. It is advisable to flatten and shape at both ends of the rail simultaneously. In this way, short cycle times and good alignment of the support surfaces of the two support feet can be obtained.

Upon the shaping of the ends of the rail, a stepwise offset 100 is preferably developed at the same time in the transition region between the horizontal rail 1 and its curved part 3. This permits a transition without mismatch between the rail 1 and the free end of each cover cap 8 which rests on the offset 100. The transition is further supported by a beveling on the end of the cap.

The cover cap 8 can be fastened on the support foot 2 by means of clip elements 11 formed on the cap. For this purpose, each support foot 2 has a top side wall opening 12 for the clip elements and has undercuts 13 for engagement behind the clip elements. Beads 15 formed on a cover cap 8 engage in the undercuts 14.

The main part of the roof railing in FIGS. 1 to 4 is thus the rail 1 which is bent at its ends so that its bottom side corresponds to the contour of a traditional support of the roof railing. In addition, the rail 1 is so shaped in the region of its end that a support surface 4 is produced which is used as a resting surface against the roof of the vehicle. The fastening of the railing is effected from above the railing by means of an ordinary screw or bolt as fastening element 7 with an additional washer 16. Since there is always a slit through which water can enter between the cover cap 8 and the rail 1 or the support foot 2, sealing of the hole 6 is necessary. The type of attachment shown represents only one of the possible manner of attachment. For instance, threaded bolts can also extend out of the roof of the vehicle and be received in the holes 6. The support feet can then be clamped onto the roof by means of nuts. In that case, it is advisable to place a packing, for instance of sponge rubber, between the roof and the support surface 4.

Figure 5:
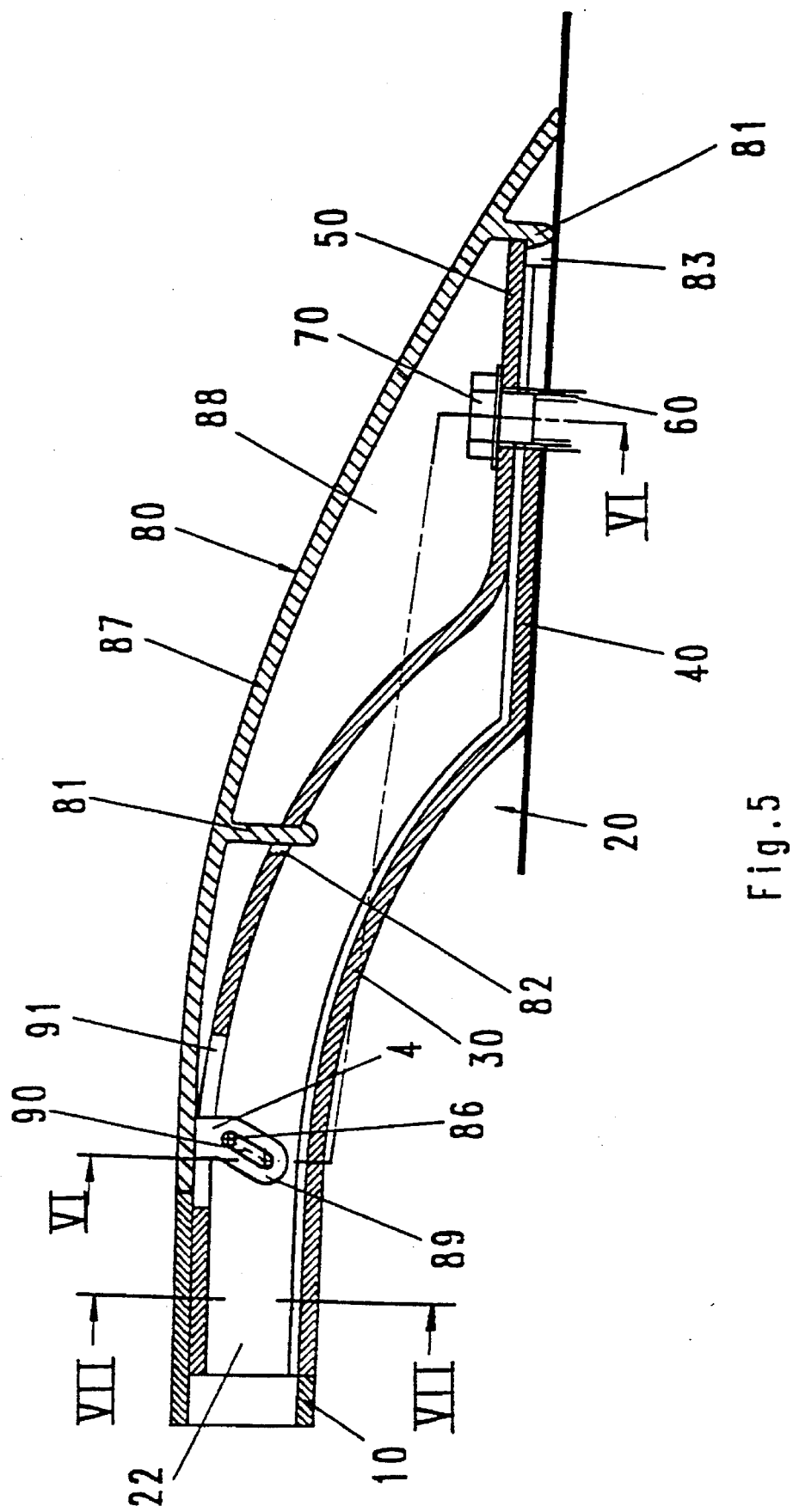
FIG. 5 shows a second embodiment of the roof railing with a support foot fastened on the rail, seen in cross section, approximately along the line V—V of FIG. 6.
Figure 7:
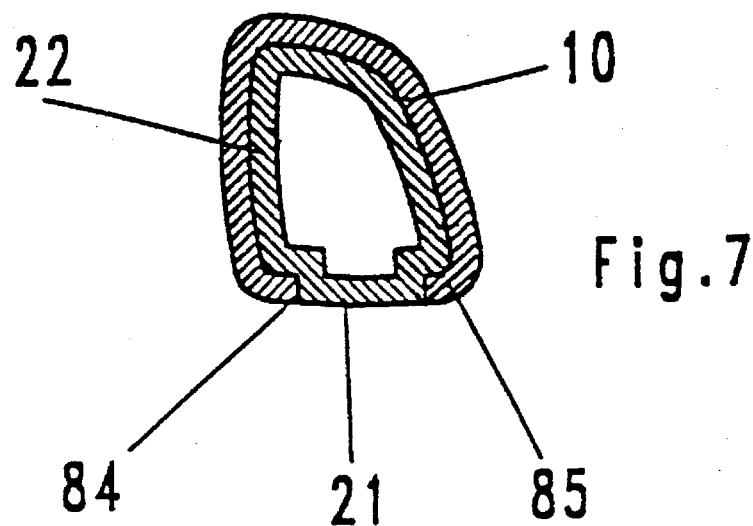
FIG. 7 is a cross section along the line VII—VII of FIG. 5.
Figure 6:
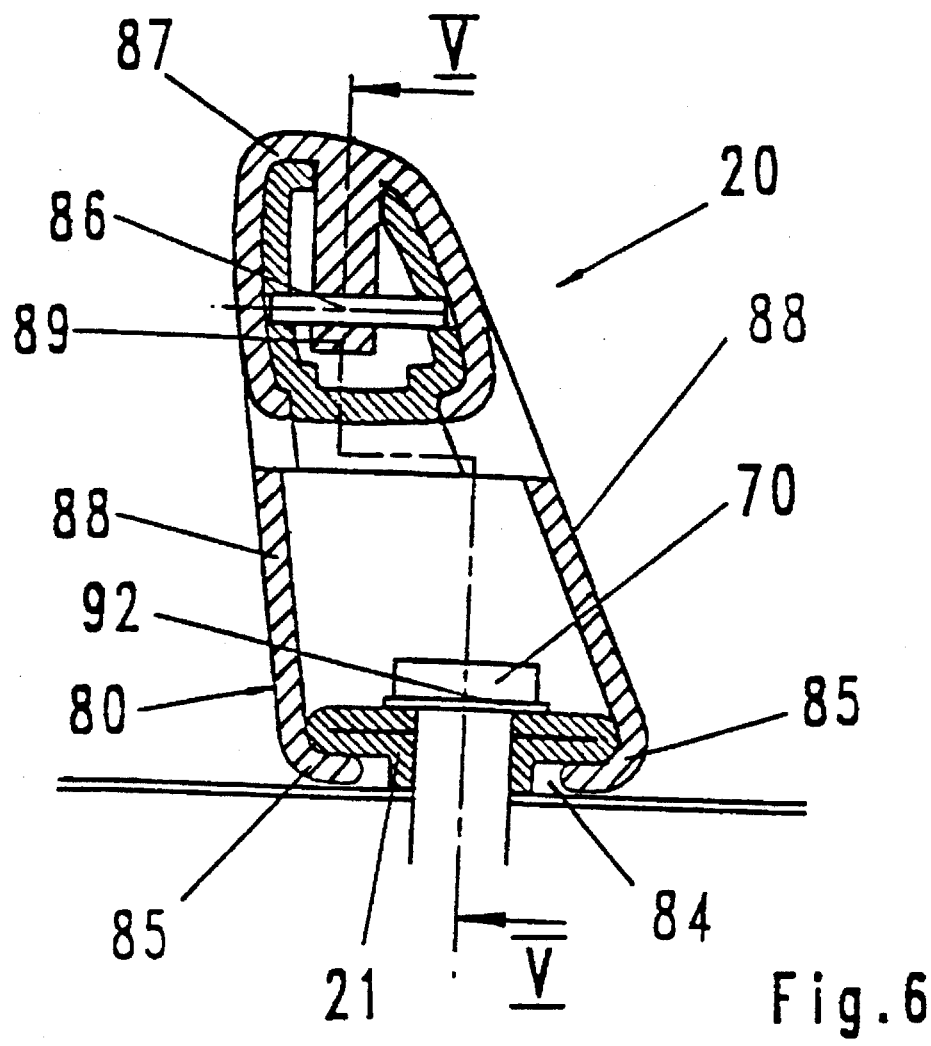
FIG. 6 is a cross section approximately along the line VI—VI of FIG. 5.

The embodiment shown in FIGS. 5 to 7 differs from that shown in FIGS. 1 to 4 in that the rail 10 and the support feet 20 are separate structural parts. Both the rail 10 and the support feet 20 are formed from an extruded profiled member, preferably made of aluminum. Each support foot 20 is formed with a downwardly descending curved bottom part 30 and an adjoining freely terminating substantially flat support surface 40 which is spaced vertically below but substantially parallel to the rail 10. A flattened wall region 50 of the extruded profiled member rests against the top side of the support surface 40. A hole 60 for the passage of a fastening element 70 passes through the wall region 50 and the wall region of the support foot 20 which forms the support surface 40. The support foot 20 is supplemented in appearance by a cover cap 80 which covers the shaped regions from above and also from the sides.

The cover cap 80 has clip elements 81 by which it can be fastened to the support foot 20. For receiving the clip elements, the support foot 20 has a wall opening 82 and undercuts 83 for entry of the clip elements and engagement behind the undercuts. Projections 28 on the cover cap 80 engage in the undercuts 84 (free spaces). Each cover cap 80 is pivoted in swingable manner on its support foot 20 by a pivot pin 86 in such a manner that, in its upwardly swung position shown in dash-dot line in FIG. 5, they permit access to the fastening elements 70.

Each support foot 20 is developed with a downwardly protruding rib 21 which defines free spaces to the left and right of the rib which forms the undercuts 84. Each foot furthermore has an insert pin 82 which fits into the ends of the rail and engages in form locked manner into a slot opening provided in the end region of the rail 10. Gluing or pinning should be provided between rail 10 and insert pin 22.

The cover cap 80 is of generally U-shaped cross section with a web 87 covering the support foot on its top and with legs 88 which cover the two opposite sides of the support foot 20. On the free edge region of the legs 88 there are inwardly directed projections of material 85 which can be engaged in the free spaces 84. On the bottom side of the web of the cover cap 80, the clip elements 81 and a bearing bracket 89 are formed. The bearing bracket 89 has a slot 90 for the pivot pin 86. The bearing bracket can have an undercut slot opening on its free end so that, with pivot pin premounted, the cover cap can be attached to the pivot pin by pushing. An opening 91 is provided in the web 87 of the cover cap 80 for the passage of the bearing bracket 89.

The attachment of the rail is preferably effected from above, using an ordinary hexagon head screw as a fastening part 70. Below that, a washer 92 is provided.

The development of the support feet 2 can correspond to the development of the support feet 20, while the development of the cover cap 8 can also correspond to the development of the cover cap 80.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roof railing for a motor vehicle roof, the railing comprising:

a rail having opposite ends;

a respective support foot on at least one of the ends of the rail for resting on the roof; the support foot comprising an extruded tubular profile, the foot including a descending curved portion extending out from the respective end of the rail and terminating in a support surface which is spaced below but is substantially parallel to the rail;

the profile including a flattened wall region which rests on top of the support surface;

a hole passing through the support surface and the wall region and a fastening element for passing through the hole in the support surface and the wall region; and a cover cap on the support foot, said railing extending along the longitudinal direction of the vehicle roof when mounted thereon.

2. The roof railing of claim 1, wherein the support surface is substantially flat and extends parallel to the rail and the wall region on top of the support surface is flattened.

3. The roof railing of claim 1, further comprising clip elements for clipping the cover cap to the support foot.

4. The roof railing of claim 3, wherein the clip elements are on the cover cap and engage the support foot.

5. The roof railing of claim 4, wherein the support foot has a wall opening and has undercuts therein for entry of and engagement with the clip elements formed on the cover cap.

6. The roof railing of claim 4, wherein the cover cap is shaped to normally cover the fastening element, and further comprising a pivot pin connecting the cover cap to the support foot for enabling the cover cap to be swung upward off the support foot and permitting access to the fastening element.

7. The roof railing of claim 6, wherein the cover cap has a U-shaped cross section including a web covering a top portion of the support foot and legs extending from the web down side portions of the support foot.

8. The roof failing of claim 7, further comprising the legs of the cover cap having free edge regions and inwardly directed projections on the edge regions for being engaged on the support foot.

9. The roof railing of claim 7, wherein at least some of the clip elements are developed on a bottom portion of the web of the cover cap and further comprising a bearing bracket developed on a bottom portion of the cover cap for receiving a pivot pin for the cover cap.

10. The roof railing of claim 4, wherein the cover cap has a U-shaped cross section including a web covering the top of the support foot and legs extending from the web down the sides of the support foot.

11. The roof railing of claim 4, wherein the support foot includes a downwardly protruding continuous rib extending along the length .of the support foot, the foot being shaped to develop free spaces to its lateral sides;

the support foot including an insert pin which fits into a respective end of the rail to hold the support foot at the rail; and slot openings in end regions of the rail for receiving the rib on the support foot.

12. The roof railing of claim 1, wherein the rail has an end region shaped into the support foot such that the rail and the support foot are a single structural unit.

13. The roof railing of claim 12, wherein there is a transition region between the rail and the curved part of the foot; a step shaped offset between the rail and the curved part for defining a transition between the rail and an end of the cover cap which rests on the offset.

14. The roof railing of claim 1, wherein there is a transition region between the rail and the curved part of the foot; a step shaped offset between the rail and the curved part for defining a transition between the rail and the end of a cover cap which rests on the offset.

15. A roof railing for a motor vehicle roof, the railing comprising:

a rail having opposite ends;

a respective support foot on at least one of the ends of the rail for resting on the roof; the support foot comprising an extruded tubular profile, the foot including a descending curved portion extending out from the respective end of the rail and terminating in a support surface which is spaced below but is substantially parallel to the rail;

the profile including a flattened wall region which rests on top of the support surface;

a hole passing through the support surface and the wall region and a fastening element for passing through the hole in the support surface and the wall region;

a cover cap on the support foot;

a clip element for clipping the cover cap to the support foot, with the clip element on the cover cap and engaging the support foot, wherein the support foot has a wall opening and has undercuts therein for entry of and engagement with the clip elements formed on the cover cap.

16. A roof railing for a motor vehicle roof, the railing comprising:

a rail having opposite ends;

a respective support foot on at least one of the ends of the rail for resting on the roof; the support foot comprising an extruded tubular profile, the foot including a descending curved portion extending out from the respective end of the rail and terminating in a support surface which is spaced below but is substantially parallel to the rail;

the profile including a flattened wall region which rests on top of the support surface;

a hole passing through the support surface and the wall region and a fastening element for passing through the hole in the support surface and the wall region;

a cover cap on the support foot;

the rail having an end region shaped into the support foot such that the rail and the support foot are a single structural unit, wherein there is a transition region between the rail and the curved part of the foot; a step shaped offset between the rail and the curved part for defining a transition between the rail and an end of the cover cap which rests on the offset.

17. A roof railing for a motor vehicle roof, the railing comprising:

a rail having opposite ends;

a respective support foot on at least one of the ends of the rail for resting on the roof; the support foot comprising an extruded tubular profile, the foot including a descending curved portion extending out from the respective end of the rail and terminating in a support surface which is spaced below but is substantially parallel to the rail;

the profile including a flattened wall region which rests on top of the support surface;

a hole passing through the support surface and the wall region and a fastening element for passing through the hole in the support surface and the wall region;

a cover cap on the support foot;

wherein there is a transition region between the rail and the curved part of the foot; a step shaped offset between the rail and the curved part for defining a transition between the rail and an end of the cover caps which rests on the offset.

* * * * *